United States Patent [19]

Lamb

[11] Patent Number: 5,082,123
[45] Date of Patent: Jan. 21, 1992

[54] SPORTING GOODS RACK

[76] Inventor: Rocky D. Lamb, 4637 Baynard St., San Diego, Calif. 92109

[21] Appl. No.: 726,850

[22] Filed: Jul. 8, 1991

[51] Int. Cl.⁵ ............................................... A47F 5/08
[52] U.S. Cl. ....................................... 211/87; 211/18; 211/60.1
[58] Field of Search .................. 211/60.1, 18, 87, 106, 211/105.2, 32, 35, 48, 63, 75, 71; 248/551, 687, 345.1

[56] References Cited

U.S. PATENT DOCUMENTS

| | | | |
|---|---|---|---|
| 450,419 | 4/1891 | McIlhenny | 211/71 |
| 2,692,053 | 10/1954 | Calhoun et al. | 248/551 X |
| 3,884,439 | 5/1975 | Teninga | 211/71 X |
| 4,421,238 | 12/1983 | Patton | 211/87 |

Primary Examiner—Carl D. Friedman
Assistant Examiner—Korie H. Chan
Attorney, Agent, or Firm—Ralph S. Branscomb

[57] ABSTRACT

A wall-mounted sporting goods rack utilizes two bars, each of which has an upright portion which is mountable to a wall or other upright surface, with an extended portion which projects from the wall to support surfboards, bicycles, windsurfers, skis and the like. The rack construction utilizes a core of corrosion resistant steel tubing covered with a relatively soft polyethylene foam for padding. With the sleeve being parted to the rear of the upright section of the core, this permits the sleeve to be pulled forward exposing the core so that screws may be inserted through the upright portion of the core into the wall, with the sleeve subsequently being snapped in place around the core to protect the sporting goods item and hide the screw heads and the core.

11 Claims, 2 Drawing Sheets

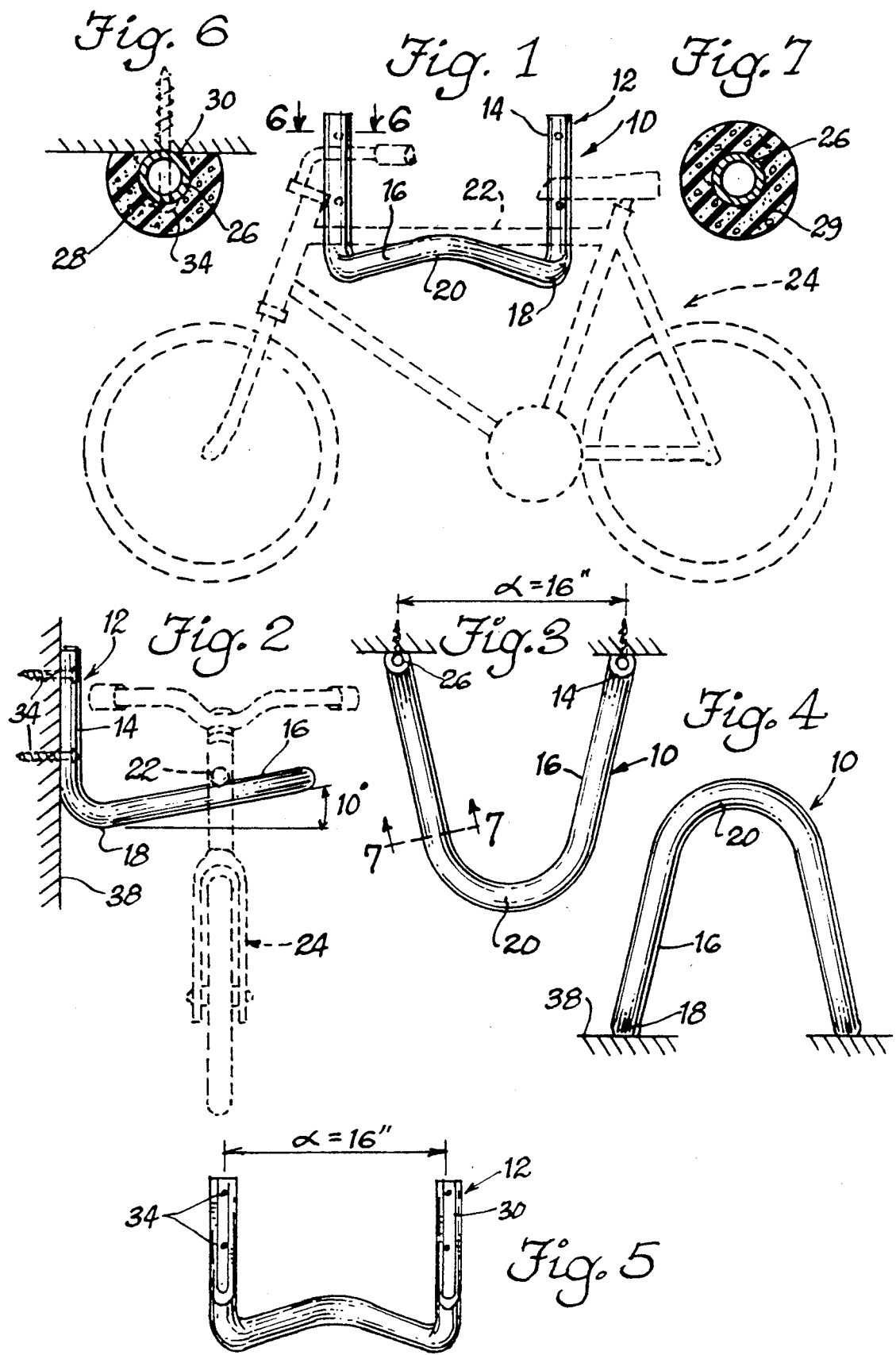

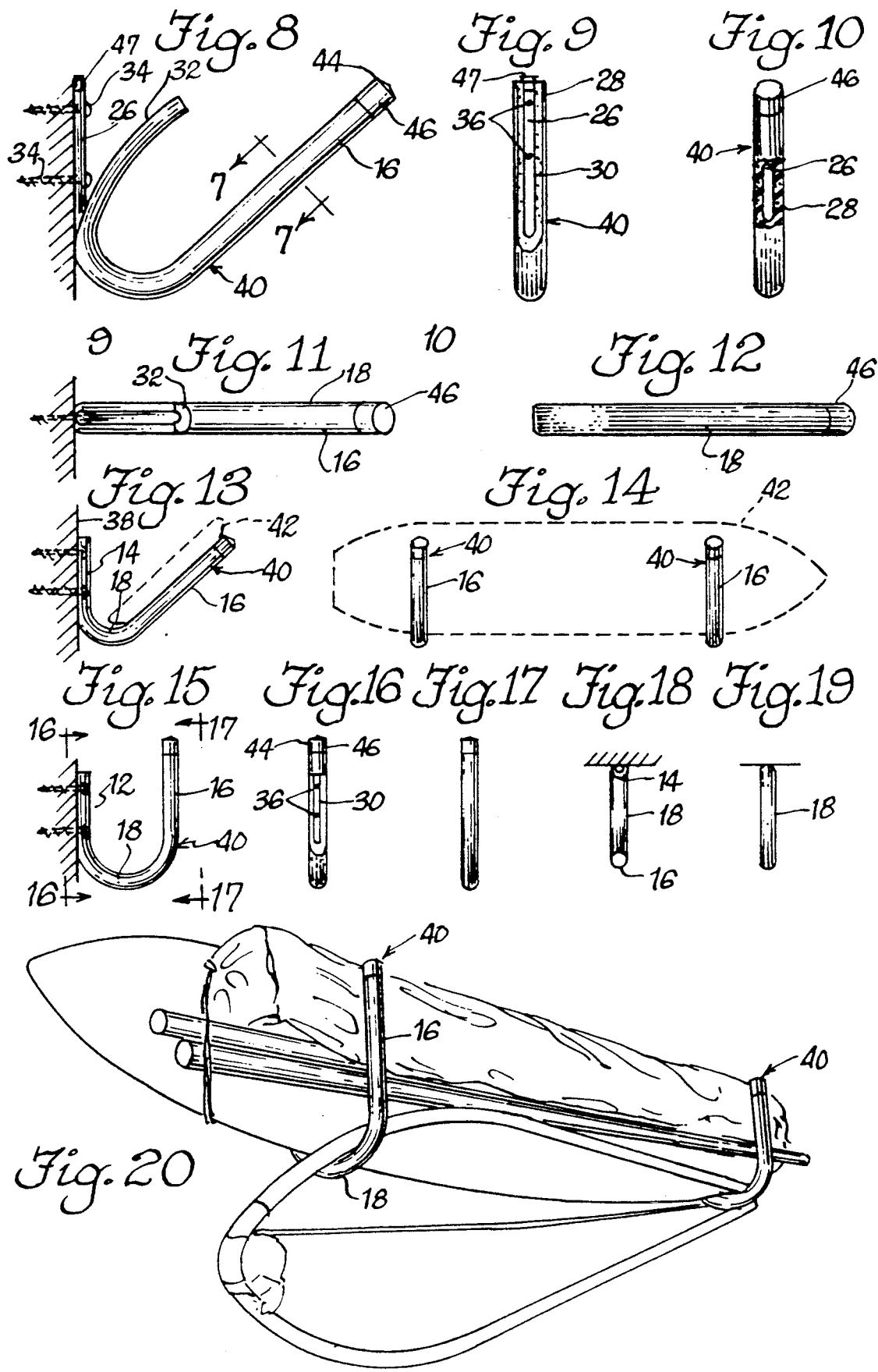

SPORTING GOODS RACK

BACKGROUND OF THE INVENTION

The instant invention is in the field of supporting structures for sporting goods and other items that might typically be lying on the ground or leaning against a wall inside or outside an apartment, house or garage. Typically, these are relatively large objects compared to small items such as hand tools.

It has traditionally been tricky to provide storage places for relatively large sporting goods items which are used out-of-doors but should be stored inside a garage, house or apartment or other safe place to prevent theft. These items, such as surfboards, windsurfers, bicycles, kayaks and skis are small enough to subject them to theft because they can be carried away, unlike a power boat or trailer which need only be chained down. Therefore, they should ideally be kept within the confines of a building, but out of the way of ordinary activities which take place in the building, such as the shop functions which are often incorporated into a garage.

Of this group, surfboards and windsurfers are generally the lightest and the most portable. When not in use, these are often kept in the apartment, house, garage or some other protected space to prevent theft and structural breakdown from prolonged exposure to the sun's harmful ultraviolet rays. Bicycles also generally must be kept inside for purposes of minimizing corrosion, and are often left leaning against a wall or sometimes hung by the front wheel on a hook screwed into a roof joist in the garage. This tends to distort the front wheel and requires that the user elevate the bicycle largely overhead in order to hook the wheel, also causing the roof joist to bear a heavier load.

Additionally, a bicycle hook will by and large work only for bicycles, and other racks and shelves provided for particular pieces of equipment often are adapted particularly for that equipment.

There is a need, therefore, for a generally universal or semi-universal rack structure which can be used in one form or another to store and support a variety of different pieces of sporting goods equipment.

SUMMARY OF THE INVENTION

The instant invention fulfills the above stated need and comprises a universal rack structure, which, in one of its three embodiments, will support, a number of sporting goods items such as surfboards and bicycles. The racks conserve and organize space, and also provide an attractive display for the sporting good item.

The main form of the rack comprises a pair of bars with an upright portion which is screwed or nailed to a wall surface. The bars each comprise a central core of corrosion resistant steel tubing or the equivalent, which is covered with a relatively thick, soft resilient polyethylene foam to protect the items being stored on the rack.

The upright portion of the rack which is mounted to a wall or other vertical surface has a flattened slit in the rear of the foam sleeve so that the sleeve may be pulled forwardly to expose the upright portion of the core. Screws may then be passed through screw holes in the core and into a wall, subsequent to which the foam may be snapped back into place over the core to cover the screw holes, the screws, and the core, thus giving added padding and protection to the sporting good item.

In two embodiments the two bars are separate from one another and have extending portions which support the surfboard, windsurfer or other elongated item of sporting equipment. In the third embodiment, the two bars connect at the ends to form a continuous support loop, which is designed primarily for supporting a bicycle by its top frame member. In this embodiment, the upright portions of the bars are spaced on sixteen inch centers to conform to the universal stud spacing standard of the United States.

BRIEF DESCRIPTION OF THE DRAWINGS

FIG. 1 is a front elevation view of the first, bicycle-supporting embodiment of the rack;
FIG. 2 is a view from the left side of FIG. 1;
FIG. 3 is a top plan view of the rack of FIG. 1;
FIG. 4 is a bottom plan view of the rack of FIG. 1;
FIG. 5 is a rear elevation view of the rack of FIG. 1;
FIG. 6 is a section taken along line 6—6 of FIG. 1;
FIG. 7 is a section taken along 7—7 of FIG. 8;
FIG. 8 is a side elevation view of a second embodiment, with the foam of the upright portion pulled forward for mounting;
FIG. 9 is a rear elevation view of the rack bar of FIG. 8;
FIG. 10 is a front elevation view of the rack bar of FIG. 8 with a portion of the foam sleeve cut away;
FIG. 11 is a top plan view of the embodiment of FIG. 8;
FIG. 12 is a bottom plan view of the embodiment of FIG. 8;
FIG. 13 is a side elevation view of the embodiment of FIG. 8 illustrating a surfboard in phantom, supported by the rack;
FIG. 14 is a front elevation view of the two-bar rack of FIGS. 8 through 13 illustrating a surfboard supported thereon in phantom;
FIG. 15 is a side elevation view of a third embodiment of the rack similar to that of FIGS. 8 through 14, but with a more U-shaped contour;
FIG. 16 is a view of the embodiment of FIG. 15 taken along line 16—16;
FIG. 17 is a view of the embodiment of FIG. 15 taken along line 17—17 of FIG. 15;
FIG. 18 is a top plan view of the embodiment of FIG. 15;
FIG. 19 is a bottom plan view of the embodiment of FIG. 15; and,
FIG. 20 is a perspective view of the third embodiment in use, holding a windsurfer and its accessory equipment.

DETAILED DESCRIPTION OF THE PREFERRED EMBODIMENT

The first embodiment of the invention is shown at 10 in FIGS. 1 through 5 and is configured in the form of a bicycle rack. The rack 10 has two bars 12, each of which constitutes an upright portion 14, an extended support portion 16, and a curved, connection portion 18 such that the entire bar 12 is continuous.

In the bicycle embodiment, the extended ends of the side bars 12 are connected to form a loop 20, best seen in FIG. 3. The main frame bar 22 of the bicycle 24 rests on the extended support portion 16 of the rack. This naturally causes the weight of the bicycle to form an indentation between the underside of the main frame bar and the soft foam padding of the rack. This indentation or "notch", along with the loop which is angled upwardly 10° from horizontal, prevents the bicycle from sliding around or slipping off the rack as shown in FIGS. 1 and 2. In the embodiments shown, it would be possible to support more than one bicycle on the rack by rotating the handlebars and reversing the directions of the bicycles.

The rack is made from a central, rigid tube 26 which extends the whole length of the rack. In the production unit this tube is corrosion resistant steel and is bent to shape with conventional tube-bending jigs and techniques.

Covering the tube substantially in its entirety is a soft polyethylene foam sleeve 28. This sleeve is a continuous member which is slipped over the entire rack core from one end to achieve the configuration illustrated in FIGS. 1 through 5.

The upright portions 14 of the bars 12 which comprise the rack 10 have a relieved split portion 30 in the sleeve at both ends as best shown in FIG. 5. This split permits the portion of the sleeve at the upright portions of the bars to be deflected forwardly as shown at 32 in FIG. 8, permitting access to the screws 34 which pass through the screw holes 36 into a wall or other vertical or substantially vertical surface 38. Once the screws (or nails, etc.) are screwed into the wall, the forwardly deflected portion 32 can be snapped back over the core as shown in FIGS. 1 through 5 to cover the screw heads and the upright portion of the core. The split portion is flat to lie flush against the wall, and wraps around the core more than 180° to ensure a positive engagement when snapped back in place.

In order to accommodate standard stud spacing, the upright portions 14 of the bar are spaced sixteen inches apart on center as indicated at α in FIGS. 3 and 5.

Although the first embodiment illustrated in FIGS. 1 through 6 has been disclosed as a bicycle rack, clearly it could support a number of different sporting goods items, including surfboards, skateboards, snowboards and even a small kayak. However, two other embodiments of the invention are specifically adapted to support other sporting goods articles. As illustrated in FIGS. 8 through 14, two separate bars 40 are used to support a windsurfer, a surfboard as indicated at 42, or any other elongated item. These two separate bars can be spaced at any desired width. The two bars 40 that constitute this embodiment include the upright portion 14, the connecting portion 18, and the extending portion 16, which in this case extends out at an angle of about 45° to the vertical.

In a third embodiment, illustrated in FIGS. 15 through 20, the same core and foam construction, with the bars having the upright portion, the connecting portion and the extended portion, is used. However, in this case the extended portion of the bar bends into a complete upright orientation as best shown in FIG. 15. This would be most suitable for holding windsurfers and their accompanying rigging comprising the mast, boom and sail as shown in FIG. 20.

In the second two embodiments, each of the bars 40 has a distal end 44 which is covered with a smooth vinyl end cap 46. This end cap is for decorative purposes, but also protects against nicks from the hard inner core.

There is also a small plastic plug 47 at the other end of each bar in all embodiments to prevent dust and debris from falling inside the core, which would ordinarily be hollow. The plug also prevents any rough edges or burrs from cutting the person installing the rack.

These three embodiments will accommodate any medium weight sporting goods item and help eliminate clutter often found on the floor or leaning against a wall. They provide more open space for the garage, house or apartment where every inch counts.

Considering the high cost of sporting goods, this invention fulfills a definite need to efficiently store and protect these goods in a reliable low cost manner.

It is hereby claimed:

1. A wall-mountable sporting goods rack comprising:
   (a) a pair of bars, each having an upright portion for mounting to a substantially vertical surface, an extended support portion, and an intermediate portion joining said upright and said extended support portion as a continuous member;
   (b) each of said bars having a rigid inner core and an outer foam sleeve slidably covering said inner core;
   (c) the foam sleeve covering the upright portion of each of said bars having a rearward split to permit direct contact between said core and an upright surface.

2. Structure according to claim 1 wherein the upright portion of said outer foam sleeve is resilient and capable of flexing away from the upright portion of said core to expose same for fastening same to a vertical surface.

3. Structure according to claim 2 wherein the upright portion of said foam sleeve defines a substantially flat surface substantially flush with the rear surface of the upright portion of said tube.

4. Structure according to claim 2 wherein said upright portions define screw holes and including screws to pass through said holes with the heads of said screws being covered by said foam sleeve.

5. Structure according to claim 4 wherein the upright support portion of said foam sleeve covers more than 180° is positively retained on said core.

6. Structure according to claim 5 wherein each of said bars is terminated at its distal end with a smooth plastic cap.

7. Structure according to claim 6 wherein said extended support portion extends at an angle of on the order of 45° to the angle of said upright portion.

8. Structure according to claim 5 wherein the extended support portion of one bar of said pair of bars is connected to the extended support portion of the other bar of said pair of bars to define a continuous support member.

9. Structure according to claim 8 wherein said support member is substantially plane-defining and defines a plane lying on the order of 80° with said upright portions.

10. Structure according to claim 9 wherein the extended support portions of said bars are angled inwardly.

11. Structure according to claim 6 wherein said upright portions are mutually spaced on 16 inch centers.

* * * * *